May 18, 1926.

G. H. HAIGH ET AL 1,585,382

DEPTH GAUGE FOR TANKS

Filed April 17, 1923

2 Sheets-Sheet 2

INVENTORS.
George H. Haigh, and
Edward J. Richards,
BY
Edward A. Lawrence
their ATTORNEY.

Patented May 18, 1926.

1,585,382

UNITED STATES PATENT OFFICE.

GEORGE H. HAIGH AND EDWARD J. RICHARDS, OF PITTSBURGH, PENNSYLVANIA.

DEPTH GAUGE FOR TANKS.

Application filed April 17, 1923. Serial No. 632,650.

Our invention consists in new and improved depth gauge mechanism for tanks for containing or storing liquids, such as gasoline.

In the case of tanks of relatively large capacity, to determine the quantity of gasoline or other liquid contained therein, the depth of the liquid in the tank must be measured with great accuracy.

The object which we have in view is to provide a gauge mechanism which will accurately measure the depth of liquid in a tank; which may be readily installed in or removed from a tank, and which will be durable and simple in construction.

Generally speaking our improved gauge mechanism is of the following construction. We mount upon the top of the tank a dial which is preferably marked off or graduated to indicate feet, inches and divisions of inches, and upon which works one or two hands, the hands being actuated by a float which rides on the surface of the liquid, the float being guided by means of two or more flexible guides secured at the upper end to a fixed support and having their lower end attached to a weight which holds the guides taut, and which rests upon the floor or bottom of the tank.

The float is attached to a band wire which runs over a grooved wheel carried by a support at the top of the tank and operatively connected to the indicating hand or hands, and over a second grooved wheel mounted on said weight.

Means are provided whereby any torque, which might result from the fact that the weight rested unevenly on the floor, as for instance when the weight rests upon a rivet head, will be relieved from the guides and the grooved wheels, so that at all times the guides are maintained in proper alinement and the operation of the gauge is not affected by the unevenness of the surface upon which the weight rests.

Means are also provided for detachably mounting the gauge mechanism on the tank without interfering with the use of the dome for introducing or withdrawing liquid etc.

Other novel features of construction and arrangement of parts will appear from the following description.

Figure 1:
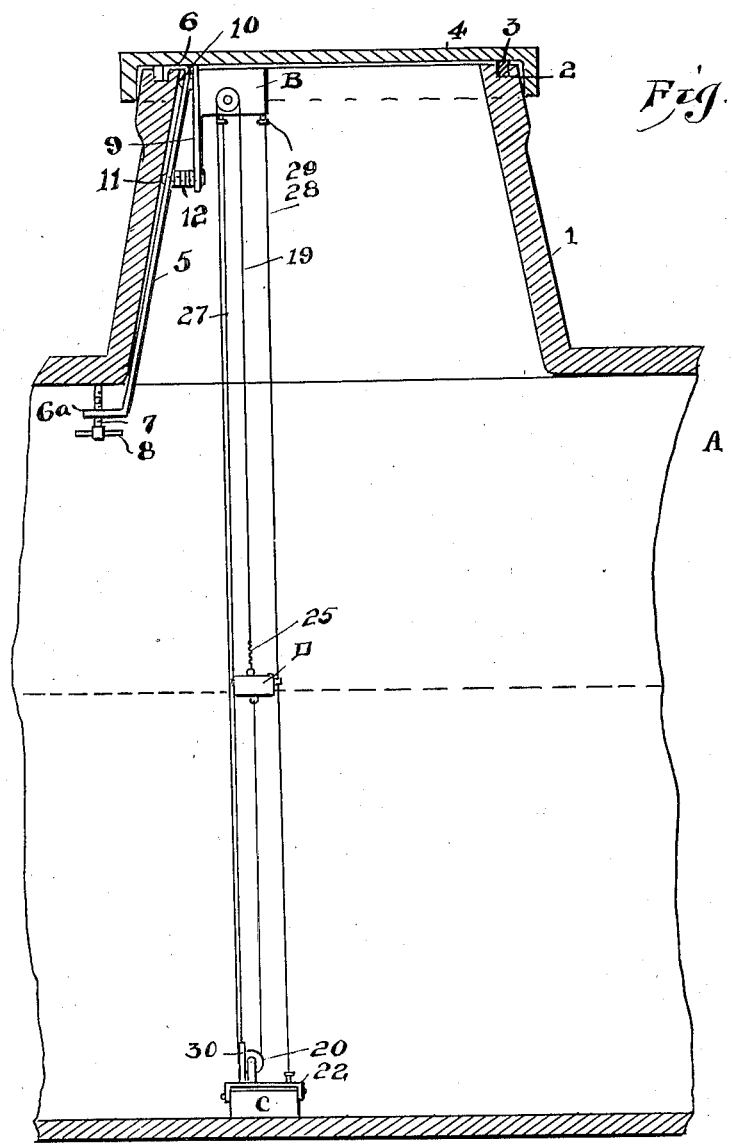
Figure 2:
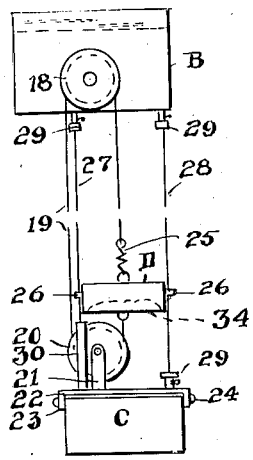
Figure 3:
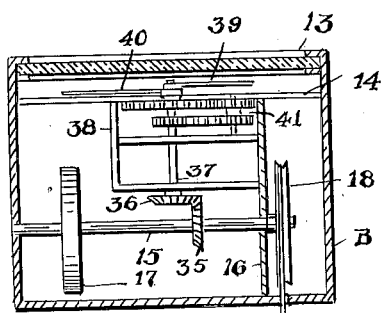
Figure 4:
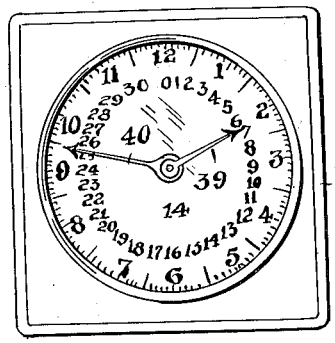
Figure 5:
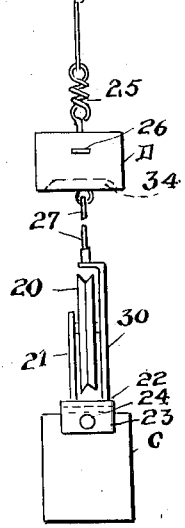

In the accompanying drawings which are however merely intended to illustrate a practical embodiment of the principles of our invention without limiting the scope of the latter to the construction shown, Fig. 1 is an elevation, with a tank shown in broken section, showing our gauge mechanism mounted in a tank; Fig. 2 is a broken elevation showing the gauge mechanism on a large scale; Fig. 3 is an enlarged view, looking from the right in Fig. 2, of the gauge mechanism, the dial box being shown in vertical section; Fig. 4 is a plan view of the same, and Fig. 5 is an enlarged detail showing a convenient manner for anchoring the float guides.

The following is a detailed description of the drawings.

The tank A is shown provided with the usual dome or upwardly flanged manhole 1 which is shown upwardly tapering so that its wall inclines inwardly from the vertical. The top edge of the dome is shown provided with the recess 2 in which is seated the gasket 3 which gasket is compressed by the cover 4 to form a gas-tight closure.

B is the dial box of the gauge mechanism, and the same is mounted in the dome in such a manner as to be out of the way of the lid, and also so as not to interfere with the use of the dome for the introduction of or withdrawal of liquid from the tank or with the other uses to which the dome is put.

Thus we have shown the box B mounted in the following manner.

5 is an anchor bar whose upper end is provided with a hook 6 which is hooked over the edge of the dome from within and extends down into the groove 2, the intermediate portion of the bar 5 is parallel with the wall of the dome and the lower end of said bar is provided with a horizontal portion 6$^a$ which is provided with a threaded hole. 7 is a screw bolt having a pointed end, which bolt is screwed up through the hole in the bar, and the end of the bolt is provided with a hand grip 8. By screwing the bolt 7 tight up against the inner wall of the tank the anchor bar 5 is firmly clamped in position.

To the side of the box B is riveted or otherwise attached a vertically depending bar 9 which is clamped to the anchor bar 5 by the bolts 10 and 11. By interposing a proper number of washers 12 on the bolt 11 between the bars 5 and 9, the box B may be properly leveled notwithstanding the inclination of the wall of the dome 1.

13 is a top closure for the box B and 14 is a dial horizontally disposed in said box below said closure. Said dial is graduated to feet, inches and fractions of inches, as shown in Fig. 4. The inner annular series of numerals shown in Fig. 4 represent feet, while the outer annular series of numerals represent inches, and the intervening graduations between the latter represent fractions of inches.

15 represents a shaft horizontally journaled in the box B as by having one of its ends journaled in a socket in one wall of the box while its other end protrudes through and is journaled in a vertical support or partition 16 in said box. 17 is a balance wheel mounted on said shaft and 18 is a pulley mounted on the opposite end of said shaft.

From said pulley runs a driving or band wire 19 which also extends down around a second grooved pulley 20 which has its axle journaled in the twin stands 21 extending upwardly from a frame or bar 22, whose ends 23 are vertically downturned and pierced to receive the pins 24 on the opposite ends of the weight C. The opposite ends of the wire 19 are connected to the upper and lower surfaces of a hollow float D which may be made of copper or other suitable material. 25 is a helical spring which is interposed between the upper end of the wire 19 and the top of the float D to compensate for the expansion and contraction of the wire 19 caused by changes in temperature, and also to provide the necessary frictional engagement between the wire 19 and the grooved pulley 18.

At two opposite sides the float D is provided with horizontally disposed pierced brackets 26 through which extend the guides 27 and 28. The upper ends of said guides are attached to bolts 29 depending from the box B. The lower end of the guide 27 is similarly attached to the horizontal, upper end of an angular bracket 30 which is fixed at its foot to the frame or bar 22. The upper end of the bracket 30 is inturned over the pulley 20 so as to properly center the guide 27. The lower end of the guide 28 is attached to a bolt 29 on the bar 22 Fig. 5.

In Fig. 5 we have shown a convenient method of attaching the ends of the guide wires. Thus the bolt is provided with a vertical bore 31 extending down from its top and connecting with a radial port 32, the end of the guide, for instance the guide 27, is inserted into the bore 31 and out through the port 32 and pulled taut, and then either wound about the bolt or knotted as shown at 33. The bolt may then be rotated to screw it farther into its threaded hole, thus stretching the guide wire taut. Any other convenient means for securing and tightening the guide wires may be used.

The lower face of the float D is preferably concave or hollowed upwardly as shown at 34 thus enabling the float to adhere by a suction action to the surface of the gasoline and preventing it from rocking or jumping when moving up or down. The shaft 15 is provided with a bevel gear 35 which meshes with a bevel gear 36 on the lower end of a shaft 37 vertically journaled in a frame 38 in the box B. 39 and 40 are the feet and inches hands respectively mounted on the shaft 37, the hand 39 being driven directly by the shaft 37 while the hand 40 is driven by an intermediate train of gears 41 which are similar to the gearing which drives the minute hand of a clock.

The mechanism is so proportioned and assembled that any change of level in the liquid in the tank A will be accurately measured in feet, inches and fractions of inches on the dial 14.

The mechanism may be readily removed from the tank by first loosening the bolt 7 so as to unclamp the anchor bar 5 from the dome.

It is evident there will be no laterally swinging or vibration of the float, owing to the fact that the float guides are held taut. Thus there is no binding of the float on the guides, and the latter responds accurately to the changes of level of the liquid.

It is evident from the foregoing that the depth of liquid in the tank will be accurately indicated in feet, inches and fraction of inches on the dial. It is also evident that the installation of our improved gauge mechanism in a tank will in no wise interfere with the filling or emptying of the tank, nor with the inspection of the same. The gauge mechanism may be installed in the tank without requiring any holes to be drilled or punched therein, and may be quickly installed or removed from the tank when desired.

Frequently the floor of the tank is rounded, as in the case of horizontally disposed tubular tanks, or the heads of rivets or bolts may protrude upwardly therefrom, in either case rendering it difficult or impossible to maintain the weight C in a truly horizontal position. If the float guides were connected directly to the tilted weight, it would interfere seriously with the operation of the float. However, the provision of the frame or bar 22 to which the guides are attached, and which is swingingly mounted on the weight assures the proper anchoring of the lower ends of the guides.

What we desire to claim is:—

1. In a depth gauge mechanism for liquid containing tanks, the combination of a support mounted at the top of the tank, indicating mechanism at the top of the tank, a pulley rotatably mounted on said support and operatively connected to said indicating mechanism, a weighted member resting on the bottom of the tank, a pulley rotatably mounted on said weighted member, a float, and a band wire attached to said float and running over said pulleys, whereby the rise and fall of said float will operate said indicating device.

2. In a depth gauge mechanism for liquid containing tanks, the combination of a support mounted at the top of the tank, indicating mechanism at the top of the tank, a pulley rotatably mounted on said support and operatively connected to said indicating mechanism, a weighted member resting on the bottom of the tank, a pulley rotatably mounted on said weighted member, guide wires stretched taut between said support and said member, a float slidably mounted on said wires, and a band wire attached to said float and running over said pulleys whereby the rise and fall of the float will operate said indicating device.

3. In a depth gauge mechanism for liquid containing tanks, the combination of a support mounted at the top of the tank, a weight resting on the bottom of the tank, a frame pivotally mounted on the weight to compensate for tilting of the same, guides stretched between the support and the frame, a float slidably mounted on said guides, a pulley mounted on said support, a second pulley mounted on said frame, a band wire mounted on said pulleys and attached to said float, and indicating mechanism mounted at the top of the tank and operatively connected to the first named pulley whereby the movements of the float are registered by said indicating mechanism.

Signed at Pittsburgh, Pa., this 7th day of April, 1923.

GEORGE H. HAIGH.
EDWARD J. RICHARDS.